US009313207B2

(12) United States Patent
Cicchitto

(10) Patent No.: US 9,313,207 B2
(45) **Date of Patent: *Apr. 12, 2016**

(54) APPARATUS AND METHOD FOR ACCESS VALIDATION

(71) Applicant: AVATIER CORPORATION, San Ramon, CA (US)

(72) Inventor: Nelson A. Cicchitto, San Ramon, CA (US)

(73) Assignee: Avatier Corporation, San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/589,819

(22) Filed: Jan. 5, 2015

(65) Prior Publication Data

US 2015/0128225 A1 May 7, 2015

Related U.S. Application Data

(63) Continuation of application No. 13/107,760, filed on May 13, 2011, now Pat. No. 8,931,057, which is a continuation-in-part of application No. 11/552,285, filed on Oct. 24, 2006, now Pat. No. 7,950,049.

(51) Int. Cl.

| | |
|---|---|
| ***H04L 29/06*** | (2006.01) |
| ***G06F 21/60*** | (2013.01) |
| ***G06F 21/62*** | (2013.01) |

(52) U.S. Cl.

CPC ............ *H04L 63/102* (2013.01); *G06F 21/604* (2013.01); *G06F 21/6218* (2013.01); *G06F 21/6227* (2013.01); *G06F 2221/2101* (2013.01); *G06F 2221/2141* (2013.01); *G06F 2221/2145* (2013.01)

(58) Field of Classification Search

CPC ........................ G06F 21/10; G06F 2221/2141
USPC ............................................................ 726/4
See application file for complete search history.

(56) References Cited

U.S. PATENT DOCUMENTS

| | | | |
|---|---|---|---|
| 6,292,828 | B1 | 9/2001 | Williams |
| 6,546,392 | B1 | 4/2003 | Bahlmann |
| 6,671,695 | B2 | 12/2003 | Mcfadden |
| 6,947,989 | B2 | 9/2005 | Gullotta et al. |
| 7,031,962 | B2 | 4/2006 | Moses |

(Continued)

FOREIGN PATENT DOCUMENTS

| | | |
|---|---|---|
| WO | 0114989 A1 | 3/2001 |

*Primary Examiner* — Jason K Gee
(74) *Attorney, Agent, or Firm* — Michael A. Glenn; Perkins Coie LLP

(57) ABSTRACT

One or more techniques for access validation are provided. Access validation may be performed automatically or in real-time. Access validation may be at the resource level or at a sub-resource level. Techniques provided herein may be applied in a large variety of situations and industries, e.g. compliance management or inventory. Access validation reports may be generated in real-time or may link to indications of access validation in real-time. Five outcomes or options are provided, including affirmative, negative, stronger negative with larger implication, undetermined, and negative, however with temporarily granted access. A field for allowing entry of justification for access to a particular resource is provided. Reminders to validate privileges are provided. A continuous access validation process is provided. A technique for extending the hierarchy and corresponding workflow that is generated thereof is provided.

18 Claims, 10 Drawing Sheets

Separation of Duty Detection and Compliance Process

(56) References Cited

U.S. PATENT DOCUMENTS

| | | | |
|---|---|---|---|
| 7,490,347 | B1 | 2/2009 | Schneider et al. |
| 7,950,049 | B2 | 5/2011 | Chiou et al. |
| 2001/0047485 | A1 | 11/2001 | Brown et al. |
| 2002/0188458 | A1 | 12/2002 | Babbrah |
| 2003/0055652 | A1 | 3/2003 | Nichols et al. |
| 2003/0078816 | A1 | 4/2003 | Filep |
| 2003/0110246 | A1 | 6/2003 | Byrne et al. |
| 2004/0039594 | A1 | 2/2004 | Narasimhan et al. |
| 2004/0054933 | A1 | 3/2004 | Wong et al. |
| 2005/0066353 | A1 | 3/2005 | Fransdonk |
| 2005/0108526 | A1 | 5/2005 | Robertson |
| 2005/0137920 | A1 | 6/2005 | O'Connor et al. |
| 2005/0138031 | A1 | 6/2005 | Wefers |
| 2005/0138074 | A1 | 6/2005 | O'Connor et al. |
| 2005/0197952 | A1 | 9/2005 | Shea et al. |
| 2005/0246292 | A1 | 11/2005 | Sarcanin |
| 2005/0262362 | A1 | 11/2005 | Patrick et al. |
| 2006/0143231 | A1 | 6/2006 | Boccasam et al. |
| 2006/0212487 | A1 | 9/2006 | Kennis et al. |
| 2006/0236380 | A1 | 10/2006 | Bransom et al. |
| 2008/0027867 | A1 | 1/2008 | Forbes et al. |

300

Contextual Workflow Process

Separation of Duty Detection and Compliance Process

APPARATUS AND METHOD FOR ACCESS VALIDATION

CROSS REFERENCE TO RELATED APPLICATIONS

This application is a continuation of U.S. patent application Ser. No. 13/107,760 filed on May 13, 2011, which is a continuation-in-part of U.S. patent application Ser. No. 11/552,285 (now U.S. Pat. No. 7,950,049) filed on Oct. 24, 2006, the entirety of each of which is incorporated herein by this reference thereto.

BACKGROUND OF THE INVENTION

1. Technical Field

This invention relates generally to computer-implemented access validation. More specifically, this invention relates to computer-implemented access validation for a variety of industries, including compliance management.

2. Description of the Related Art

The business landscape has changed in recent years in that organizations continually attempt to achieve greater worker productivity. As a result people are often required to perform more than one specific job function or role in the organization. However, this need must be tempered by the need for the organization to comply with Sarbanes-Oxley Act of 2002.

The Sarbanes-Oxley Act (SOX) has imposed new requirements on public companies in areas of assessment and oversight of control systems that support external financial disclosures. One of the new requirements is that a company's external auditor, for the first time, must provide an annual opinion on the reliability of the control representation made by a company's CEO and CFO. This has caused companies to struggle to comply with SOX since its enactment.

In many cases, SOX has generated some confusion for corporate officers charged with overseeing compliance. It was initially thought SOX would primarily affect corporate finance departments, but organizations discovered that SOX also affected information technology (IT) functions. However, traditional audit/compliance approaches and tools used in most companies today are inadequate to meet the virtually "real time" assessment and monitoring expectations imposed by SOX, particularly compliance with §404.

In addition to assigning or granting privileges that are compliant with policy, at times it is also desired for an enterprise to provide a type of validation report about the validation of access to resources by entities.

SUMMARY OF THE INVENTION

One embodiment provides a method and system for providing a hybrid meta-directory for recording a grant of privileges. Method and system aspects of this embodiment include: assigning a privilege identifier to each privilege stored in a privilege repository; in response to a granting of one of the privileges to a target user, storing the privilege identifier assigned to the granted privilege in an authoritative source domain record for the target user; and in response to receiving a query of the authoritative source domain based on a user ID, retrieving a list of privileges granted to the corresponding target user based on the privilege identifiers associated with the user ID.

In a second embodiment, a Sarbanes-Oxley separation of duty detection and compliance method and system are provided. Aspects of this embodiment include: displaying a hierarchical list of resources for selection of at least one of a plurality of privileges associated with the resources; in response to a user selecting at least one of the privileges from the hierarchical list, adding the selected privilege to a request cart to allow the user to initiate a request for the privilege; for each item added to the request cart, checking a separation of duty privilege list to determine whether any of the privileges in the request cart conflict with any privilege currently granted to the user or present in the request cart; and in response to detecting a conflict, indicating to the user that the privilege cannot be granted concurrently with the conflicting privilege, thereby facilitating compliance with separation of duties requirements of Sarbanes-Oxley.

According to the method and system disclosed herein, the hybrid meta-directory stores all hard and soft resource privileges granted to a user with the user's account, without requiring the storing of any user information in a privilege repository. A comprehensive asset report can be generated for an individual user without having to query every resource system that the user may belong to as what might be done in the case of a common meta-directory. Using this design enables the application to have the same benefits of having all the relevant information in a single place without having to extend the schema of an existing directory, but is more efficient, easier to manage, and more secure than using a meta-directory.

In another embodiment, a method and system are provided that validates, for each hard or soft resource, access to each hard or soft resource by a particular entity.

DETAILED DESCRIPTION OF THE INVENTION

The present invention relates to a self-service resource provisioning method and system. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

In one aspect of the exemplary embodiment, a system is provided that organizes resources, such as software applications and computer systems, into a tree hierarchy, and organizes individual privileges under the resources. The system enables self-service resource provisioning through an intuitive and easy to use interface that allows the tree hierarchy of resources to be used as a store from which users select the resources and privileges they need for their job functions, and drag and drop the selected resources and privileges into a shopping cart to request the privileges. In response, a contextual workflow approval process is initiated whereby a managerial chain of approval is required to approve the request, thereby providing a collaborative enforcement mechanism for helping organizations maintain compliance with §404 of the Sarbanes-Oxley Act by ensuring that users do not obtain access to resources that they should not have access to.

In a second aspect of the exemplary embodiment, the system utilizes a hybrid meta-directory for recording a grant of privileges to users, which is used to provide a second built-in Sarbanes-Oxley detection and compliance mechanism that reduces the probability that an individual is granted access to a set of privileges that conflicts with the separation of duties according to corporate business practices.

Figure 1:
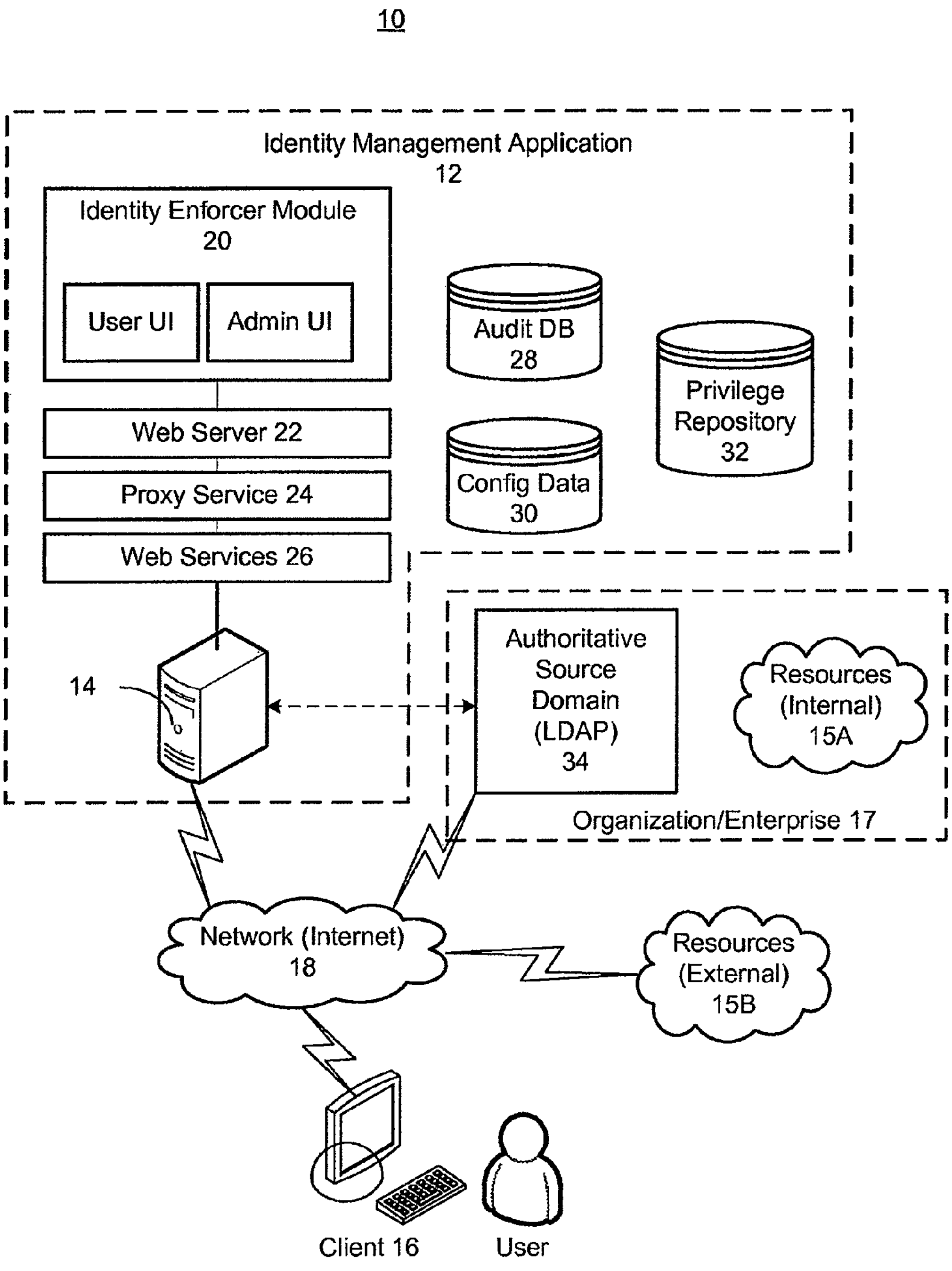
FIG. 1 is a block diagram illustrating a self-service resource provisioning and collaborative compliance enforcement system.

FIG. 1 is a block diagram illustrating a self-service resource provisioning and collaborative compliance enforcement system. The system 10 includes an identity management application 12 hosted on one or more web servers 14 that provides users with self-service resource provisioning of an organization/enterprise's internal resources 15*a* and/or of resources 15*b* external to the organization. The internal and external resources 15*a* and 15*b*, collectively referred to as resources 15, may include assets and access. Examples of an asset may include hardware and software systems, subsystems, business cards, tools, and so forth, while examples of an access may include privileges or permissions, and roles. Typically, internal resources 15*a* are owned, operated, or controlled by the organization/enterprise 17. The organization/enterprise 17 also preferably includes a network accessible authoritative source domain 34.

In one embodiment, the identity management application 12 may be implemented as an application that is used internally by the organization/enterprise 17. In another embodiment, the identity management application 12 may be implemented as a service that is provided to the organization/enterprise 17 over the network 18 a third party.

Preferably, the user accesses the identity management application 12 via a client 16 over a network 18. In one embodiment, the client 16 comprises a Web browser running on any network capable electronic device, such as a PC, workstation, laptop, or personal digital assistant (PDA), for example. In an alternative embodiment, the client 16 may comprise proprietary software for communicating with the identity management application 12, rather than a browser. The network by which the server(s) 14 hosting the identity management application 12 and the client 16 communicate preferably comprises a public network, such as the Internet, but may also comprise any type of local area network (LAN), wide area network (WAN), or wireless network (WiFi or WiMax).

The identity management application 12 may include a service referred to as the identity enforcer module 20, a software application web server 22, a proxy service 24, and Web service 26. The identity management application 12 has access to several databases/repositories including an audit database 28, a database for configuration data 30, and a self-service privileges repository 32.

The identity enforcer module 20 is the component that enables the user to intuitively request privileges to the organization's resources 15, as explained below. The user logs into the identity management application 14 through the client 16 browser as follows. The username and password entered by the user through the client 16 are received by the web server 22 and passed to the proxy service 24, which together with the authoritative source domain 34 and/or a third party authoritative service (not shown), provide access management. The proxy service 24 and authoritative source domain 34 provide run-time user authentication and authorization services to protected resources 15. The proxy service 24 has administrator rights and is capable of making changes to directories in the authoritative source domain 34.

The authoritative source domain 34 is an authorized origination point or system of record for user identity data attributes. Example of an authoritative source domain 34 is Lightweight Directory Access Protocol, or LDAP ("ell-dap"), which is a networking protocol for querying and modifying directory services running over TCP/IP. An LDAP directory usually includes a tree of entries, each of which includes a set of named attributes with values. Example types of LDAP directories include Microsoft ACTIVE DIRECTORY (AD), Sun JAVA ONE, Oracle INTERNET DIRECTORY, IBM DIRECTORY SERVER, and Novell EDIRECTORY. Users login through the LDAP, and the LDAP is used to derive the identity of the requesters, target users, the managers of the target users, and the groups that users need to be assigned to receive the appropriate rights. Once a user is authenticated in the authoritative source domain, the system can determine the manager of the user, if any, and any organizational groups for which the user is included.

The Web server software 20 provides internet services for the identity enforcer module 20, including delivering Web pages to client 16 browser and other files to applications via the HTTP protocol. In addition, the identity management application 12 utilizes web services 26, such as a Java, .NET, or service oriented architecture (SOA), that allows the identity management application 12 to communicate with other systems, such as UNIX, AS/400, and IBM mainframes.

All transactions by all users are preferably recorded and categorized in the audit database 28 in a secure manner for historical purposes. All customization information for the application, e.g., look and feel and behavior, is preferably stored in the configuration data 30 to provide a central location for backup, rather than using multiple register or INI files.

It should be understood that the functionality of the identity management application 12 may be implemented using a greater number or lesser number of software components than those shown in FIG. 1.

Figure 2:
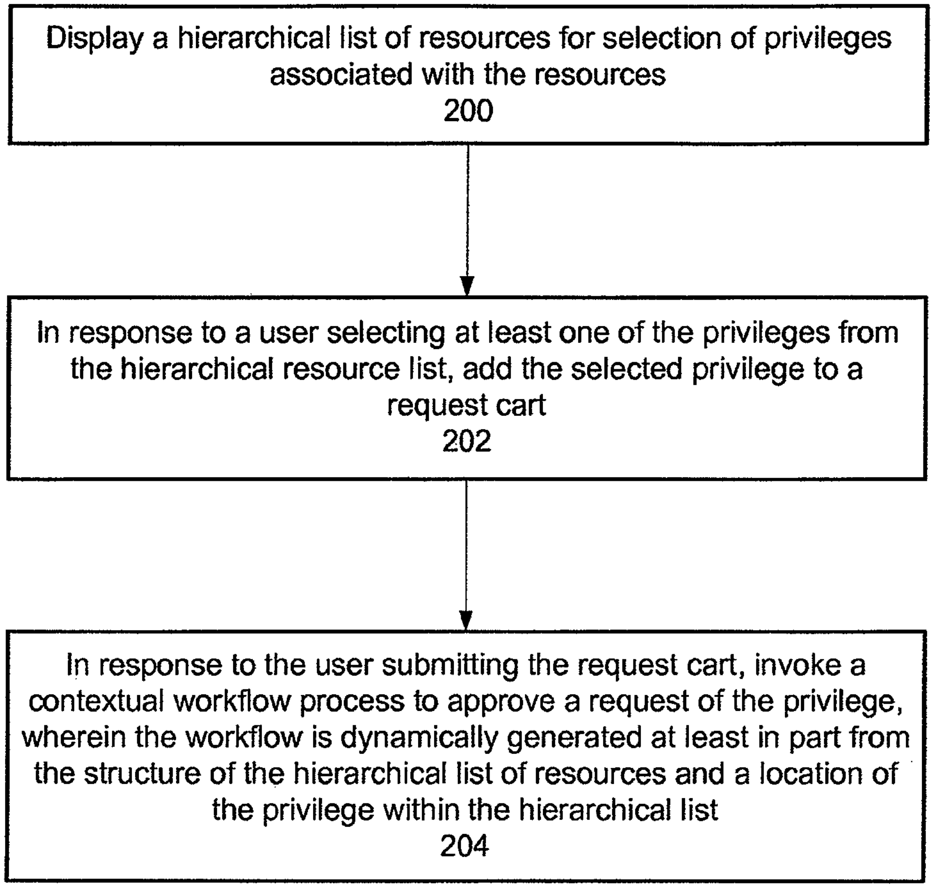
FIG. 2 is a flow diagram illustrating a process for providing self-service resource provisioning having collaborative compliance enforcement.

FIG. 2 is a flow diagram illustrating a process for providing self-service resource provisioning having collaborative compliance enforcement. The process begins in block 200 in which a user accesses the identity enforcer module 20 and the identity enforcer module 20 displays a hierarchical list of resources 15 for user selection of at least one of a plurality of privileges associated with the resources 15.

The organizational resources 15 in the hierarchical resource list 306 are configured by an administrator of the identity enforcer module 20 during a configuration phase and preferably stored in the privilege repository 32 shown in FIG. 1. The resources 15 are retrieved from the privilege repository 32 and displayed on the client 16 once the user logs into the application 12 and accesses the identity enforcer module 20 for self-service provisioning of the resources 15. Resources 15 may contain repositories of IDs, and each ID may have an owner associated with it.

Users of the system may include members of the organization/enterprise, such as officers, employees, and contractors, as well as non-members of the organization/enterprise, such as vendors, customers, and guests. Non-members must enter some form of identification before access is granted.

Figure 3A:
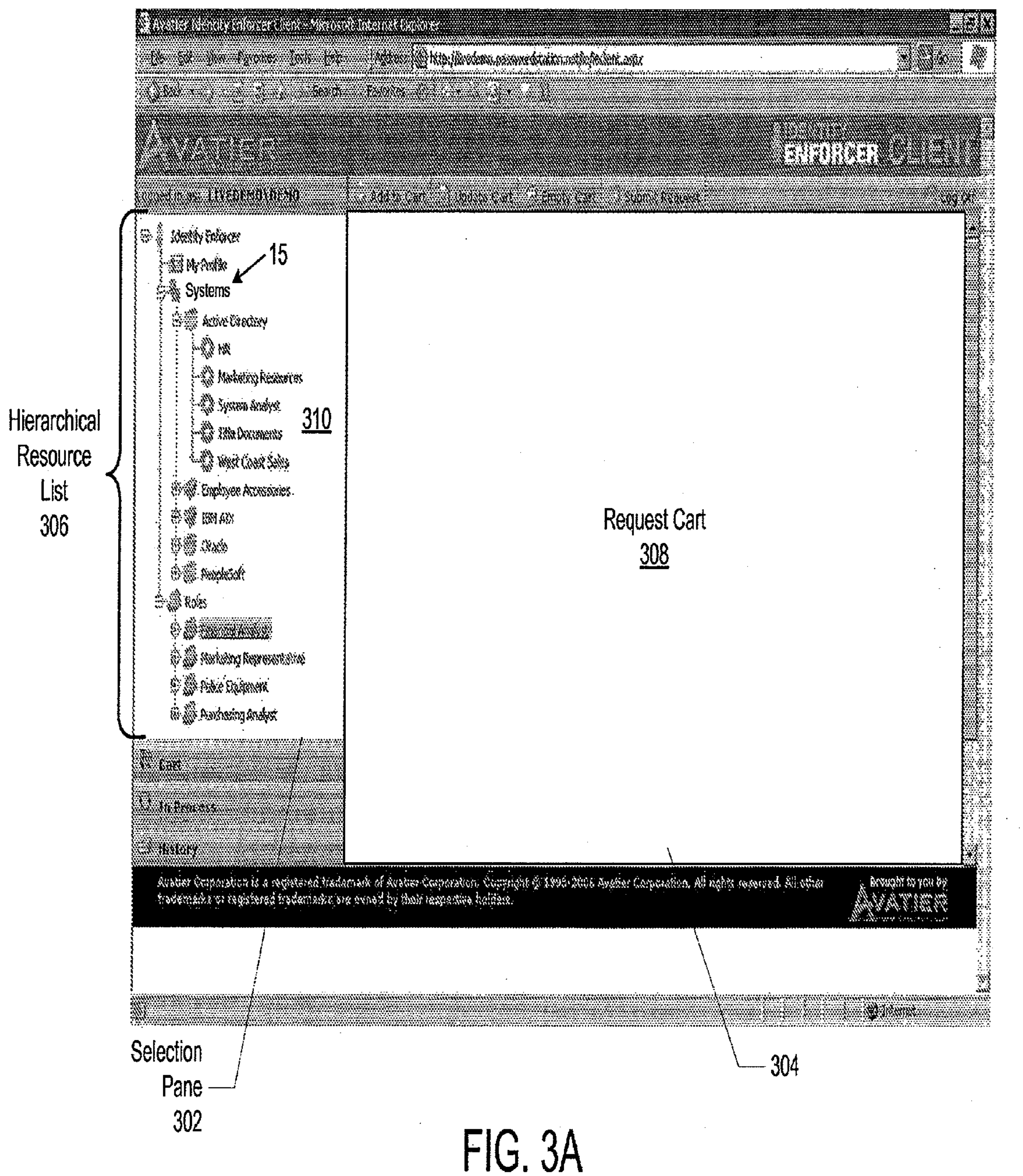
FIGS. 3A, 3B, and 3C are diagrams illustrating example screens displayed by the identity enforcer module to a client for enabling self-service resource provisioning.

FIG. 3A is a diagram illustrating an example screen displayed by the identity enforcer module 20 to the client 16 for enabling self-service resource provisioning. According to the exemplary embodiment, the identity enforcer module 20 provides a graphical user interface (GUI) based on an e-commerce metaphor in which the organizational resources 15 are organized into a "store" that users may select from and add to a request cart. The resources 15 may be analogized to aisles comprising the store, while privileges associated with the resources 15 can be analogized to the items occupying the shelves of the aisles.

The self-service resource provisioning GUI 300 preferably includes a window having two panes, a selection pane 302 and a second pane 304 for displaying a request cart 308. The selection pane 302 is for presenting the "store" of resources 15, which according to the exemplary embodiment, are displayed in a hierarchical resource list 306. The resources 15 in the resource list 306 may include hard and soft resources. Examples of hard resources include servers, computers, networks, business cards, phones, and the like. Examples of soft resources include application/system programs, databases, e-mail and voicemail accounts, files, folders, and the like. Soft resources may also include roles of positions within the organization, e.g., a financial analyst, where each role in the system is considered a collection of privileges. A soft resource may also include user accounts, which the user may select for account creation.

According to the exemplary embodiment, the user may provision or "shop" for resources required to perform a job function by selecting privileges 310 associated with the resources 15. In one respect, a privilege 310 is a permission to perform an action with respect to the associated resource 15. Examples of this type of privilege includes the ability to create a file in a directory, or to read or delete a file, access a device, or have read or write permission to a socket for communicating over the Internet. In another respect, a privilege 310 is a grantable attribute of a resource, such as the resource type and capabilities. For an example of this type of privilege, consider a resource such as a cell phone, for instance, where the privileges associated with the resource might include the type of cell phone, e.g., international or domestic, and the number of minutes in the calling plan, e.g., 1000, 500, unlimited, and the like. Generally, privileges 310 occupy leaf nodes of the resource list 306, but there may be resources 15 in the list 306 that do not explicitly list any privileges 310, in which case the resource 15 may itself represent, or include, default privileges.

By expanding the part of the resource list 306 under a selected resource 15, the privileges 310 associated with that resource 15 are displayed. For example, in the example hierarchical list 306 shown, some of the displayed resources include "Active Directory", "Employee Accessories", "IBM AIX", "Oracle", and "PeopleSoft". The hierarchical list 306 under the "Active Directory" resource 15 has been expanded, showing a level deeper into the list 306. In this example the next level displays example privileges 310 that may be provisioned for the "Active Directory" resource 15, which the are "HR", "Marketing Resources", "System Analyst", "Title Documents", and "West Coast Sales". It should be understood that the hierarchical resource list 306 may include any number of levels of resources, sub-resources, and privileges.

Referring again to FIG. 2, in block 202, in response to a user selecting at least one of the privileges 310 from the hierarchical resource list 306, the selected privilege 310 is added to the request cart 308 to enable the user to initiate a request for the privilege 310. In one embodiment, the user may select privileges 310 by simply "dragging and dropping" the privileges 310 (singularly or as group) into the request cart 308 using any type of computer input devices, such as a keyboard and mouse. Alternatively, the GUI 300 may be provided with a control, such as an "Add to Cart" button, for allowing the user to add a highlighted privilege 310 from the resource list 306 to the request cart 308.

Figure 3B:
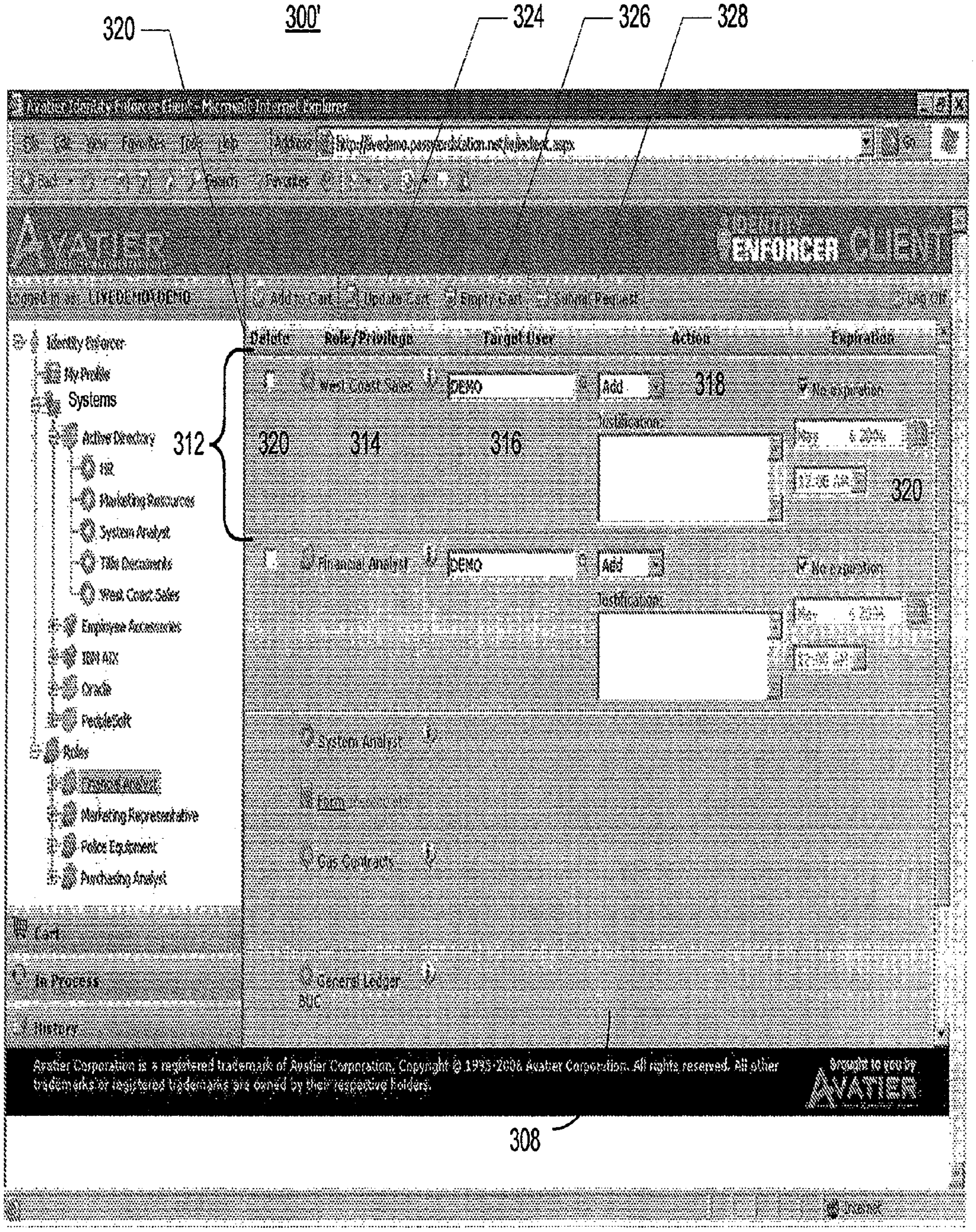

FIG. 3B is a diagram illustrating the example GUI 300' screen displayed by the identity enforcer module 20 on the client 16 after the user has added privileges 310 to the request cart 308. The request cart 308 includes an entry 312 for each privilege 310 in the request cart 308, which in turn, includes a privilege/role name 314, and a target user text box 316 for prompting the user to enter a name of the target user. The user who initiates the request for a privilege 310 is a requester, but the requester makes a request for the privilege 310 on behalf of the designated target user, which may be the requester themselves, or a third party.

The request cart 308 may also include an action control 318 for allowing the user to associate a specified action with the privilege (e.g., to order business cards or to create an account) and/or to enter a justification for requesting the privilege 310; and an expiration control 320 for entering the date and time that the privilege request expires, if any. The GUI 300' may also include a Delete control 322 for allowing the user to remove a privilege from the request cart 308, an Update Cart button 324 for allowing the user to update the request cart 308, an Empty Cart button 326 for allowing the user to remove all the privileges 312 from the request cart 308, and a Submit Request button 326 for allowing the user to submit the request for the privileges 312 in the request cart 308.

Referring again to FIG. 2, in block 204, in response to the user completing his or her selections and submitting the request cart 308, the identity enforcer module 20 invokes a contextual workflow process to approve the request for the privilege, wherein the workflow is dynamically generated at least in part from the structure of the hierarchical list of resources 306 and a location of the privilege 310 within the hierarchical tree. According to the exemplary embodiment, the contextual workflow provides built-in collaborative compliance enforcement with Sarbanes-Oxley §404, where privileges 312 are not automatically granted based on a rule set, but rather each privilege 312 is granted or approved by requesting approval from a chain of one or more people or entities associated with the privilege 310 and its corresponding resource 15 as defined by the structure of hierarchical list 306.

More specifically, once a request for a privilege 310 from the resource store is submitted for a target user, a contextual workflow is initiated in which requests for approval are sent to the target user's manager, as well as to the respective managers of the privilege 310 and the resource 15 to which the privilege 310 is linked in the resource list 306. The identity enforcer module 20 then grants or denies the user's request based on the responses received from the managers.

By requiring a chain of approvals from the manager of the target user of the requested privilege 310, the manager of the requested privilege 310, and the manager of the resource 15 (and any sub-resource) from which the privilege 310 was selected, the identity enforcer module 20 provides a managerial collaborative enforcement mechanism for helping organizations/enterprises maintain compliance with §404 of Sarbanes-Oxley.

According to an alternative embodiment, the request for privilege may be initiated by a manager on behalf of a target user. In this case, the identity enforcer module 20 sends a notice to the target user asking the target user if they need or want access to the privilege. If the target user approves the request, then the approval request is sent up the management chain, as described above.

Figure 4:
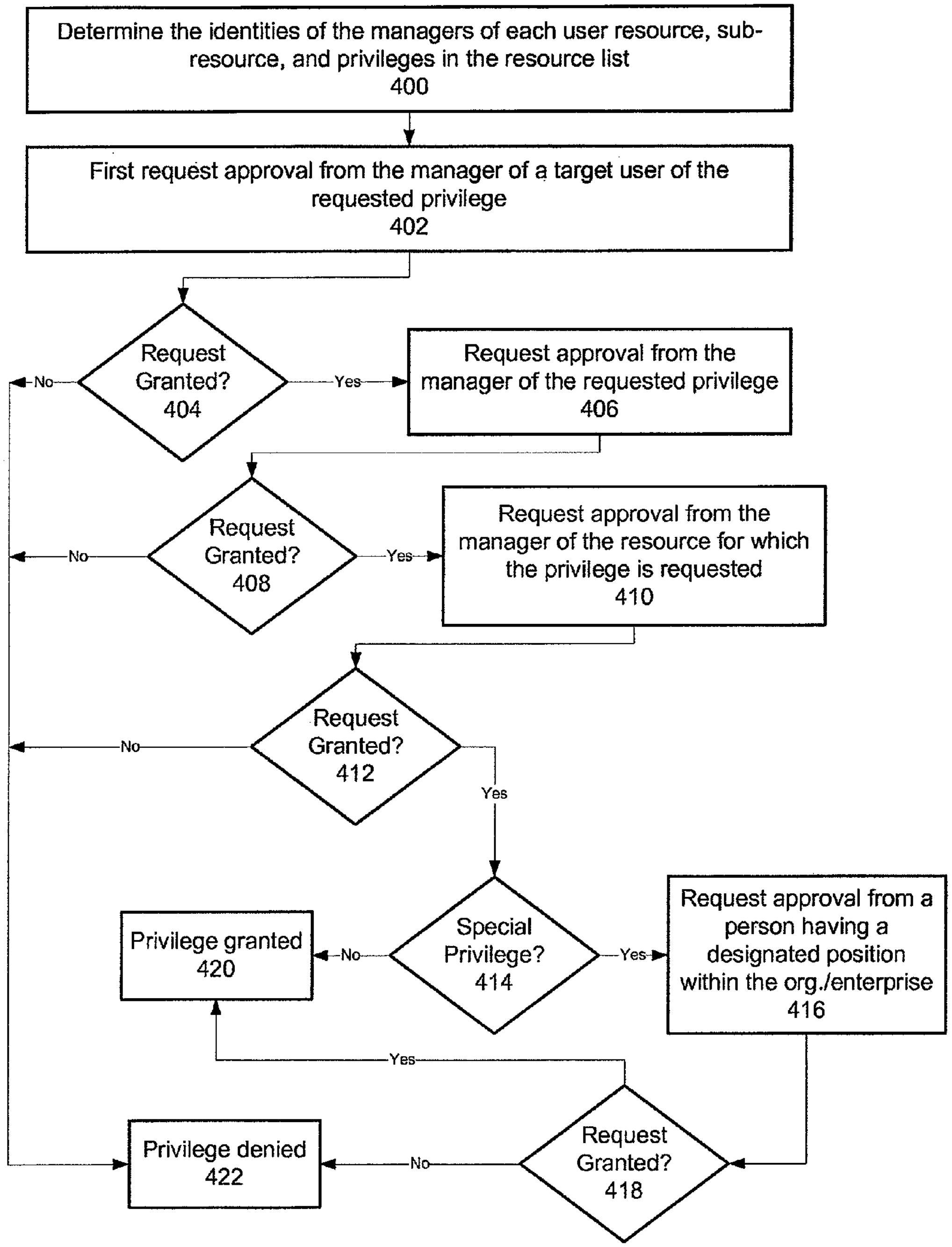
FIG. 4 is a diagram illustrating a contextual workflow process based on the structure of the hierarchical resource list in accordance with the exemplary embodiment.

FIG. 4 is a diagram illustrating a contextual workflow process based on the structure of the hierarchical resource list 306 in accordance with the exemplary embodiment. The process of generating contextual workflows begins with a configuration block in block 400 in which the identities of each owner, administrator, or manager (collectively referred to hereinafter as manager(s)) are determined of each user, resource 15, sub-resource, and privilege 310 in the resource list 306. An organization chart and/or the authoritative source domain 34, for example, may be used to identify the managers of people. In some cases, a manual process may have to be employed to compile a list of the managers of the resources 15 and privileges 310.

Then in block 402, in response to the identity enforcer module 20 receiving a request for privileges 310, e.g., by submittal of the request cart 308, the identity enforcer module 20 initiates the approval request chain whereby for each selected privilege 310, approval is first requested from the manager of a target user of the requested privilege 310.

In block 404, it is determined whether the manager granted the request. If the manager granted the request, then in block 406, approval is requested from the manager of the requested privilege 310. In block 408, it is determined if the manager of the requested privilege 310 granted the request. If so, then in block 410, approval is requested from the manager of the resource 15 for which the privilege 310 is requested. In block 412, it is determined if the manager of the resource 15 granted requests.

It should be understood that not every resource 15 and privilege 310 may have an associated manager. It should also be understood that the approval process can loop, meaning that there may be one or more privilege and resource managers and associated requests for approval depending on the level of the resource hierarchy. In addition, a designated approver may be a group rather than an individual, in which case, the workflow process may be configured to require a response to the approval request from anyone from the group or from all the people in the group.

If all the managers granted the request, then in block 414, it is determined if the privilege is marked special. According the exemplary embodiment, a special privilege is one that requires further approval by a person within a designated position in the organization/enterprise, such as an officer or executive. If so, then in block 416, approval is requested from the person having the designated position, e.g., CEO, COO, or CFO associated with granting of the special privilege.

If the privilege is not marked special and if all the managers granted the request, then in block 420, the requested privilege 310 is granted to the target user. If any of the managers deny the request, then in block 422, the request for the privilege 310 is denied.

According to an exemplary embodiment, the approval workflow associated with each privilege 310 is thus derived from the location of the privilege 310 in the hierarchical list 306, such that if the privilege 310 is moved to a different location in the hierarchical list 306, then the approval workflow is automatically changed. For example, if the privilege is moved in the list 306 from a first resource to a second resource (i.e., moved from aisle #1 in the store to aisle #2), then once the privilege is requested, the approval workflow automatically changes to include a request for approval from the manager of aisle #2, rather than the manager for aisle #1.

In one embodiment, the identity enforcer module 20 sends requests for approvals to the managers using electronic messages, such as e-mail, short messaging service (SMS), voice mail, and the like. The identity enforcer module 20 includes an interface capable of receiving responses from the managers in a like fashion. For example, if the request for the approval is sent via e-mail, the e-mail may include a hyperlink link to a secure approval site. For voice mails, the managers may respond by calling a number and answering voice prompts. Another alternative is to have the request physically printed and routed to the managers, and have the returned results typed into the system.

In one embodiment, the identity enforcer module 20 may serially send each request for approval to the managers based on the hierarchy of the contextual workflow such that a request for approval is not sent out to a manager associated at one level the hierarchy list 306 until a response is received from the manager on the adjacent lower-level of the hierarchy list 306. In another embodiment, the identity enforcer module 20 may send all the requests for approvals to the managers at one time and tabulate the results of the responses once received.

Because the contextual workflow approval process is based on human approval, the process may include inherent delays waiting on responses from the various managers in the chain. According to one embodiment, the workflow process may be configured such that a countdown timer having a designated duration is associated with each privilege 310 in the resource list 306. Once the request for the privilege 310 is submitted, the corresponding workflow process starts the countdown timer. As the countdown timer begins to expire, the workflow process sends approval request reminders at increasingly rapid intervals to the managers who have yet to respond as an escalation of the workflow. Once the time period expires, an escalation reminder notice may be sent to the approver's manager.

According to the exemplary embodiment, the identity enforcer module 20 also allows the user to view the progress of pending workflow processes that were initiated by the user.

Figure 3C:
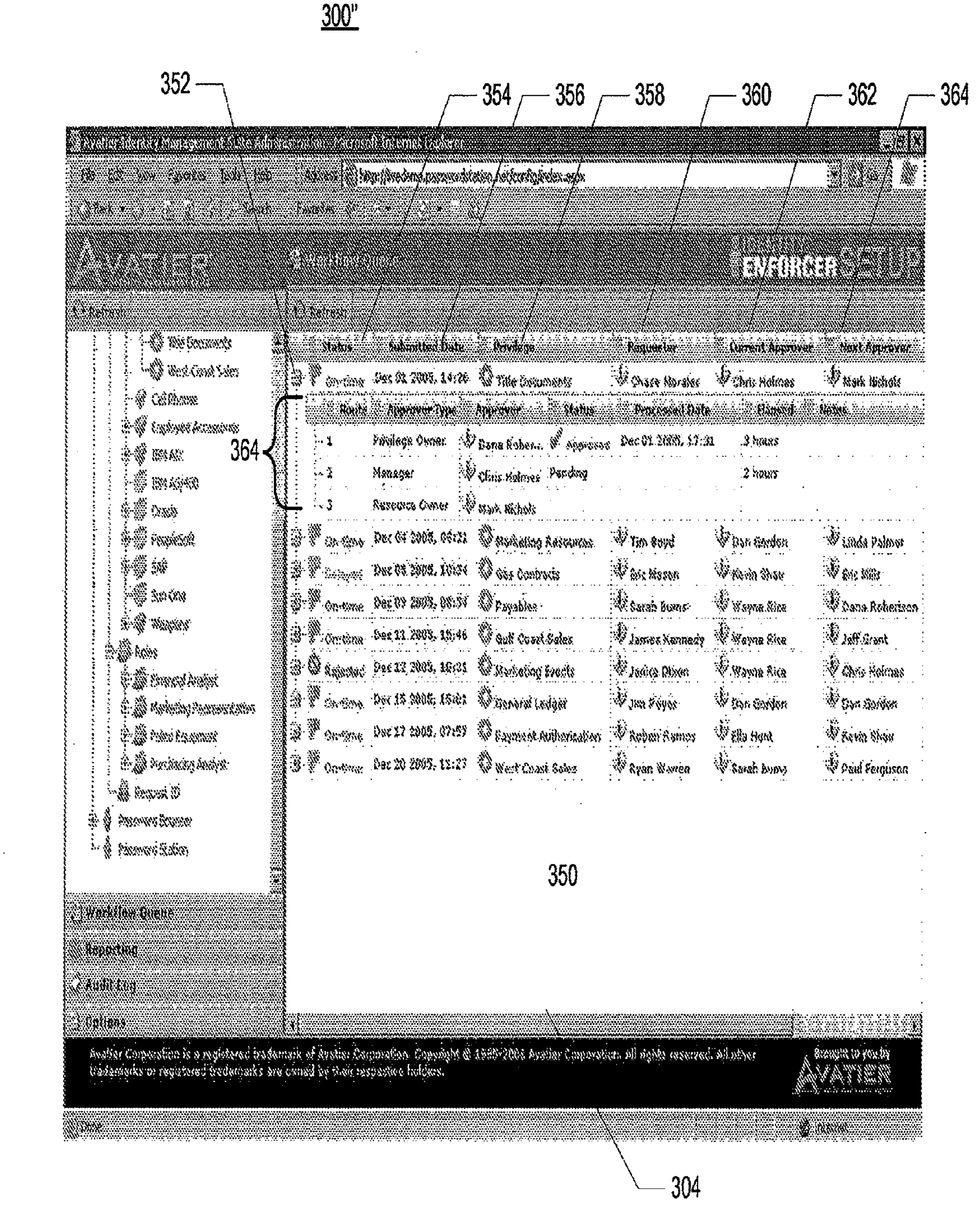

FIG. 3C is a diagram illustrating the example GUI 300" screen displayed by the identity enforcer module 20 on the client 16 in response to a request by the user to view the workflow queue. The workflow queue 350, which may be displayed in pane 304, allows the user to view which privilege requests are in the approval process, when the request was submitted, by whom, and for whom. The workflow queue 350 includes one expandable entry 352 for each workflow process. Each workflow process entry 352 may display information such as the status 354 of the process, e.g. "on time", the submittal date 356, the name of the requested privilege 358, the name of the requester 360, the name of the current approver 362, and the name of the next approver 364.

In response to the user double-clicking on one of the workflow entries 352, the GUI 300" displays a history 364 of the workflow process showing information about each approver in the approval chain and the status of the corresponding approval, including the elapsed time. In one embodiment, each time an approver in the chain approves the request, the identity enforcer module 20 sends an e-mail to the requester and/or the target indicating such.

As stated above, determining whether to grant a user's request for privileges 310 by obtaining a chain of approvals from managers of the requested privileges 310 and associated resources 15 implements self-service resource provisioning in a manner that provides collaborative compliance enforcement of §404 of the Sarbanes-Oxley Act.

According to a second aspect of the exemplary embodiment, the identity enforcer module 20 provides a second built-in Sarbanes-Oxley detection and compliance mechanism that further reduces the probability that an individual is granted access to a set of privileges that conflicts with the separation of duties according to corporate business practices.

Typically, conventional self-provisioning resource systems include a resource database that stores records for resources/privileges that can be granted to users of the system. In response to a user's request for resource, a conventional system would determine whether or not to grant user request based on a set of rules and the user's roles in the organization. Once the system approves a user's request for a resource, the granting of the request for access to the resource is recorded by storing the user's ID in association with a record for the resource in the resource database.

However, storing user IDs in association with each privilege that the user has been granted access to has drawbacks. One drawback is that if the user leaves the organization or if the user's ID changes, then an administrator of the system must search the resource database for multiple occurrences of the user's ID and either delete or modify the user ID, which can be tedious, error-prone, and time-consuming.

According to the exemplary embodiment, the identity management application 12 does not record the granting of privileges to users by storing individual user IDs in association with granted privileges in the same meta-directory where the privileges are stored. Instead, the identity management application 12 implements a hybrid metadata directory for storing granted privilege information in a manner that leverages existing directories within an organization and that provides the benefits of a meta-directory without the drawbacks.

Figure 5:
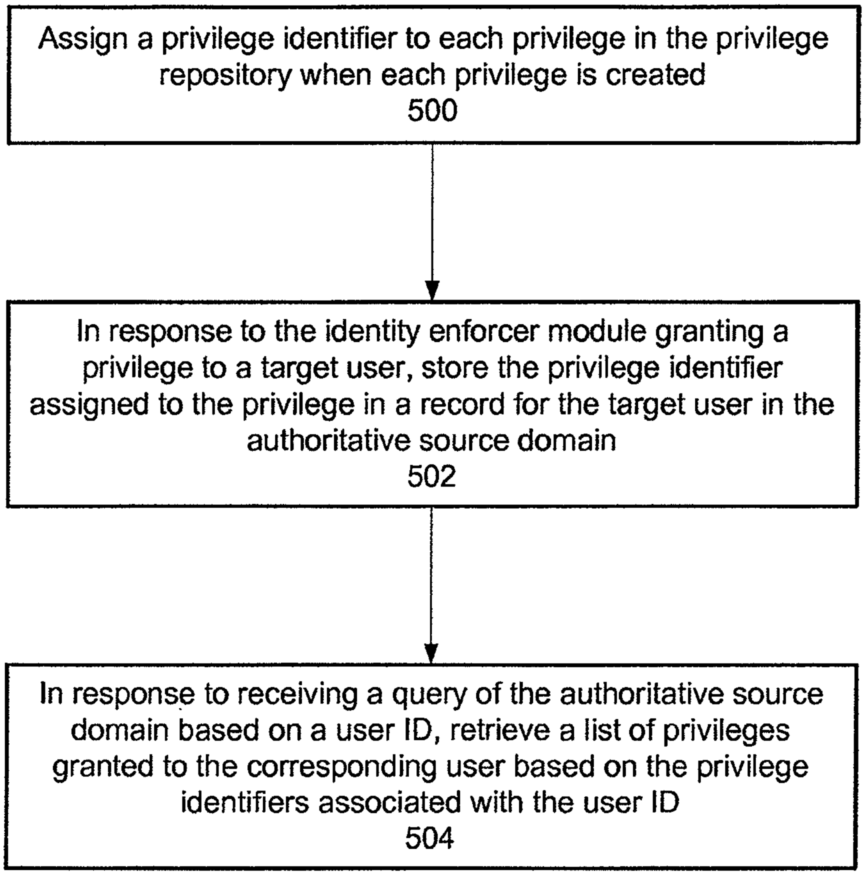
FIG. 5 is a flow diagram illustrating a process for providing a hybrid meta-directory for recording a grant of privileges to users.

FIG. 5 is a flow diagram illustrating a process for providing a hybrid meta-directory for recording a grant of privileges to users. The process begins in block 500 in which a privilege identifier is assigned to each privilege 310 stored in the privilege repository 32, preferably when each privilege 310 is created. Preferably, the privilege identifiers are substantially unique values that are assigned to the privileges 310 by an administrator of the identity management application 12 during a configuration phase of the system.

In block 502, in response to the identity enforcer module 20 granting a privilege 310 to a target user, the privilege identifier assigned to the granted privilege is stored in a record for the target user in the authoritative source domain 30. Preferably, the unique identifier for each privilege 310 granted to each user is stored as a configurable attribute under the user's entry in a LDAP directory 36 (FIG. 1). Thus, the hybrid meta-directory architecture of the exemplary embodiment utilizes the privilege repository 32 as not only a resource store, but also associates granted privileges 310 with the user's login ID in the authoritative source directory 34.

In block 504, in response to receiving a query of the authoritative source domain 34 based on a user ID, the identity management application 12 retrieves a list of privileges granted to the corresponding user based on the privilege identifiers associated with the user ID in the authoritative source domain 34. This list can then be cross-referenced against a table that may contain details about all soft and hard resources 15 the user has access to.

The hybrid meta-directory design has the advantage of being able to store all hard and soft resource privileges with the owner's user account, without storing any user information in the privilege repository 32. A comprehensive asset report can be generated for an individual user without having to query every resource system that the user may belong to as what might be done in the case of a common meta-directory. Using this design enables the application to have the same benefits of having all the relevant information in a single place without having to extend the schema of an existing directory, but is more efficient, easier to manage, and more secure than using a meta-directory.

Another advantage of the hybrid meta-directory design is that if the user's ID changes or needs to be deleted, the user's ID can be changed or deleted in the authoritative source directory 34, alleviating the need for an administrator to search a privilege database to find multiple occurrences of the user's ID and to change or delete them. Another advantage of a hybrid meta-directory is that if the self-service privilege repository becomes corrupted or otherwise inaccessible, a record of the users privileges is maintained via the authoritative source directory 34.

According to a further embodiment, the identity enforcer module 20 utilizes the hybrid meta-directory design to implement automatic separation of duty detection and compliance. In response to the user initiating a request for a selected privilege 310 by adding it to the request cart 308, the identity enforcer module 20 checks a separation of duty privilege list to determine whether any of the privileges in the request cart 308 conflict with any privilege currently granted to the user by querying the authoritative source domain 34 with the target user's ID to determine which privileges have already been granted to the user and comparing them to the privileges from the separation of duty privilege list. In response to detecting a conflict, the identity enforcer module 20 indicates to the user that the selected privilege cannot be granted concurrently with the conflicting privilege, thereby facilitating compliance with separation of duties requirements of Sarbanes-Oxley.

Figure 6:
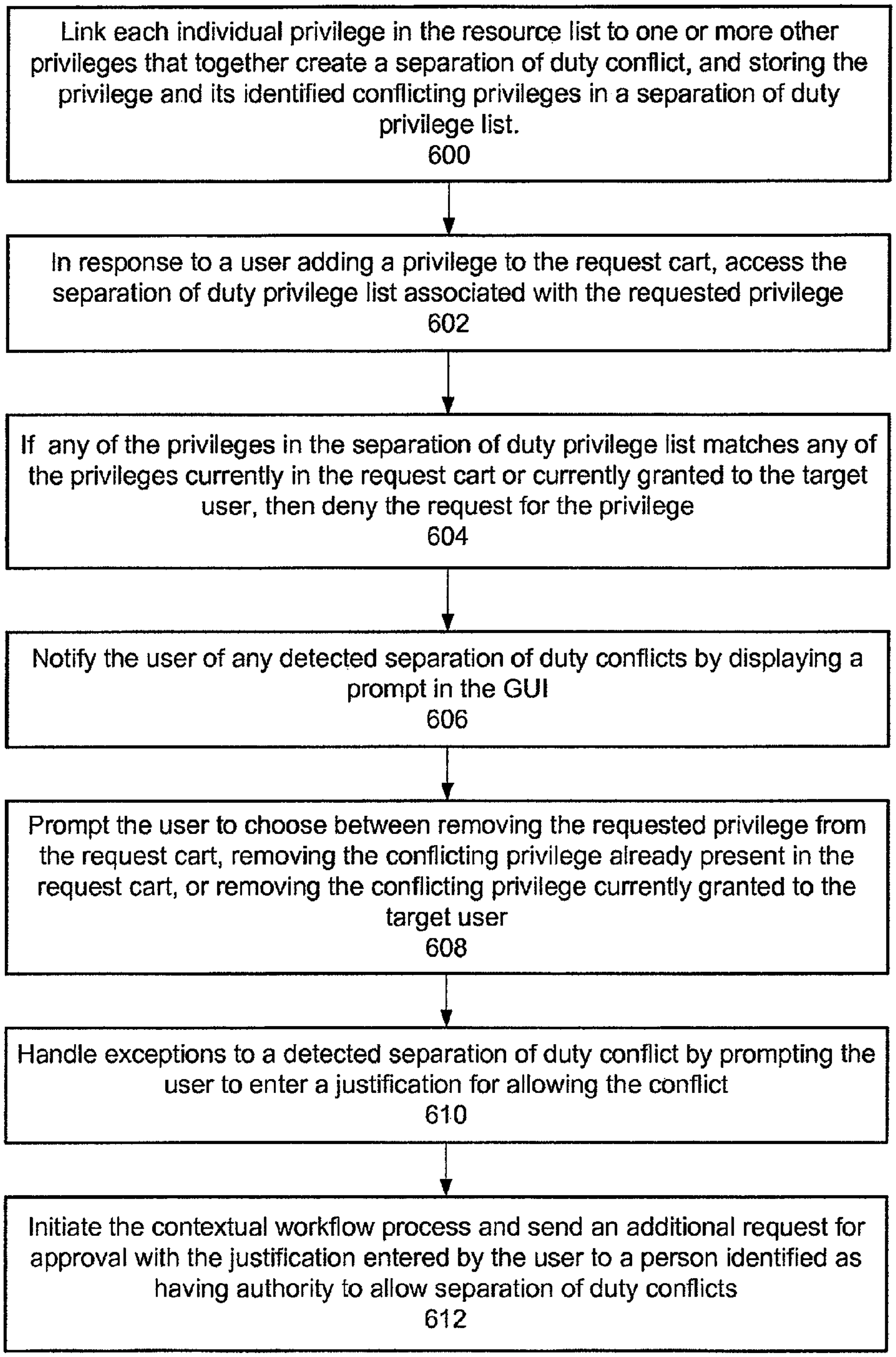
FIG. 6 is a flow diagram illustrating a Sarbanes-Oxley separation of duty detection and compliance process in accordance with the exemplary embodiment.

FIG. 6 is a flow diagram illustrating a Sarbanes-Oxley separation of duty detection and compliance process in accordance with the exemplary embodiment. The process in block 600 by providing a configuration stage of the identity enforcer module 20 that allows an administrator to link individual privileges 310 in the resource list 306 to one or more other privileges 310 that together create a separation of duty conflict, and storing the privilege and its identified conflicting privileges in a separation of duty privilege list (not shown). In one embodiment, respective separation of duty privilege lists may be associated and stored with individual privileges in the privilege repository 32. In another embodiment, respective separation of duty privilege lists may be implemented as records in a separation of duty database.

In block 602, in response to a user adding a privilege 310 to the request cart 308, the identity enforcer module 20 accesses the separation of duty privilege list associated with the requested privilege.

In block 604, if any of the privileges 310 in the separation of duty privilege list matches any of the privileges currently in the request cart 308 or currently granted to the target user, then it is determined that a separation of duty conflict has been detected and the request for the privilege 310 is denied. The identity enforcer module 20 determines whether the selected privilege 310 added to the request cart conflicts with any of the privileges currently granted to the target user by first querying the authoritative source domain 34 with the target user's ID to retrieve a list of privileges granted to the target user. The privileges in the retrieved list are then cross-referenced with the privileges listed in the separation of duty privilege list for the selected privilege.

In block 606, the identity enforcer module 20 notifies the user of any detected separation of duty conflicts by displaying a prompt in the GUI 300. In block 608, the identity enforcer module 20 preferably allows the separation of duty conflict to be cured by prompting the user to choose between removing the requested privilege 310 from the request cart 308, removing the conflicting privilege that is already present in the request cart 308, or having the conflicting privilege currently granted to the target user removed.

If the user does not wish to cure the separation of duty conflict, then according to a further embodiment, the identity enforcer module 20 is configured to handle exceptions to a detected separation of duty conflict in block 610 by prompting the user to enter a justification for allowing the conflict. In block 612, the identity enforcer module 20 initiates the contextual workflow process shown in FIG. 4 (starting with block 402), and as part of the contextual workflow process, sends an additional request for approval with the justification entered by the user to a person identified in the organization/enterprise as having authority to allow separation of duty conflicts.

Thus, according to this aspect of the exemplary embodiment, the identity enforcer module 20 assists in preventing a target user from gaining access to a privilege that they should not by detecting separation of duty conflicts and bringing the separation of duty conflicts to the attention of managers. This mechanism ensures that a person cannot accidentally or purposely gain access to two or more resources 15 or privileges 310 that they should not have simultaneous access based on predefined separation of duty conflicts.

Once all the approvals are received and a request privilege 310 is granted, how the granting of the privilege 310 is actually carried out is based on the type of privilege 310 involved. According to the exemplary embodiment, the actual granting of some types of privileges 310 is performed by the organization/enterprise that owns or controls the associated resource. For example, the granting of payment authorization permission for the privilege "Accounts Receivable" could be performed internally by a system administrator in response to a prompt or message from the identity enforcer module 20, or the permission could be granted automatically by the identity enforcer module 20. With other types of privileges 310, the granting of the privilege 310 may be performed by a third-party. Examples include the granting of a request for business cards, or the granting of a request for a cell phone (resource) with a domestic and international calling plan (the privilege), which may require that orders be placed with outside vendors to procure the items.

A computer-implemented method and system for providing self-service resource provisioning having collaborative compliance enforcement has been disclosed. The present invention has been described in accordance with the embodiments shown, and one of ordinary skill in the art will readily recognize that there could be variations to the embodiments, and any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

Access Validation

Overview of Access Validation Alone in Relation to Aforementioned Approval Process As described in embodiments hereinabove, workflow may be dynamically generated that includes having assigned owners or managers to resources, sub-resources, privileges, and target users. Workflow may be determined by reversing the order of assignments.

An embodiment contemplates not only the workflow being automatically generated, but the access validation being performed in real-time and/or automatically. For the purposes of discussion herein, access validation may be defined as validating an entity's access to an item. Put another way, access validation is the process of determining that an entity, which presently has access to a particular item, should, indeed, have access to that particular item.

It should further be appreciated that for the purposes of discussion herein, embodiments of access validation may also describe or embrace "asset" validation, where assets are defined hereinabove and examples thereof are provided hereinabove. Further examples of assets may include Blackberrys, iPads, iPhones, laptops, uniforms, badges, keys, or gins.

Figure 7:
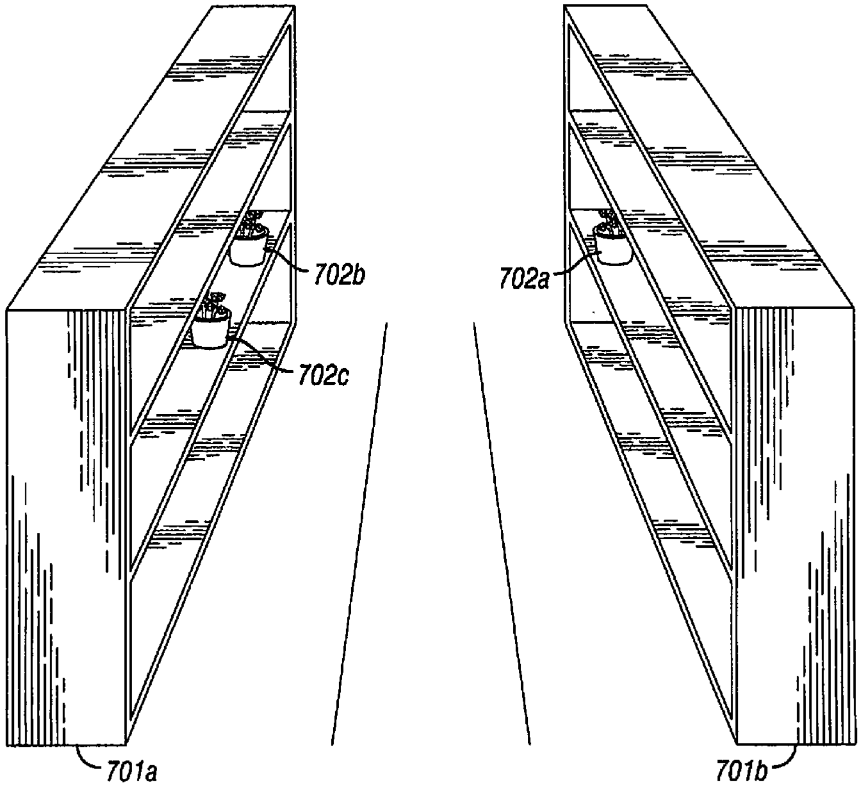
FIG. 7 is a schematic diagram of two shopping aisles in a store, each of which each hold or contain particular items, that may represent resource containers and privileges, respectively, according to an embodiment.

An embodiment of access validation can be understood by the following example as described with reference to FIG. 7. FIG. 7 is a schematic diagram of two shopping aisles **701*a* and 701*b* in a store, each of which each hold or contain particular items, 702*a*, 702*b*, and 702*c* where each aisle 701*a* and 701*b* may be considered a resource container. Each item 702*a*, 702*b*, and 702*c* may be considered a privilege that is available. Further, each aisle, 701*a* and 701*b* and each item or privilege, 702*a*, 702*b*, and 702*c*, has an owner. According to this example, an individual may come into the store and goes down aisle 701*b*, which in this case is a tree aisle, and purchase a starter Christmas tree, which is shown to be item 702*a*. Embodiments hereinabove describe one or more particular workflows by which the individual gets permission from a sequence of owners to buy starter Christmas tree 702*a*. However, according to access validation and in accordance with the example, the owner of aisle 701*b*** has to check every so often whether all those individuals who purchased all the trees in his aisle should have those trees. For example, the owner could check access validation periodically, such as every 60 or 90 days. For example, perhaps the store resides in Phoenix and there is a particular a law that doesn't allow residents to plant evergreens in Phoenix, because they may kill the natural cactuses. Another good example might include a gun store where each gun aisle has an owner and that owner may need to provide access validation data to law enforcement showing that each individual to whom the owner sold or rented a gun to should, indeed, be allowed to have such gun.

While embodiments hereinabove were concerned with granting access at the privilege level, some present embodiments involve monitoring, determining, controlling, and the like, access not at the privilege level, but at other levels, such as at the aisle level, i.e. a resource level or a sub-resource level. In one or more embodiments, those owners who granted privileges may also have to validate such privileges, e.g. privileges that were requested off of the tree aisle. Such access validation may be performed at a later point in time, such as, for example, three months after having granted one or more privileges.

Thus, it should be appreciated that in the area of identity and access management, embodiments described in sections hereinabove may be considered to be part of user provisioning, while these present embodiments of access validation may be considered to be part of access governance and compliance. It should be appreciated that embodiments described herein are contemplated to be implemented in and applicable to a wide variety of areas and not just confined to identity and access management.

It should be appreciated that one or more embodiments may be used by any individual who needs access to a particular item. For example, such individual may access the instant system over the Internet to get access to whatever the individuals wants. It should be appreciated that a unified system, which contains the relevant workflows, is contemplated by which any individual who needs anything may obtain it through such unified system.

For example, by such unified system or embodiment, a parent may register his or her child for school. In another example, a user by way of one or more embodiments may obtain a driver's license. Put another way, one or more embodiments may be used by an individual trying to obtain anything that requires approval, for example, by using one or more workflows for approval, according to an embodiment. Another example may be an individual using an embodiment to acquire a bank loan. Further, according to an embodiment, access validation is performed. For example, in an embodiment, it may be determined whether the driver's license of the individual is still valid after three years. Another example may be whether a child needs to be registered to a particular school for the upcoming year.

Further, an embodiment handles change, which may require activating another workflow. For example, during the mid-year, a child may transfer out of a particular school, the process of which may trigger the need for approval or some workflow.

An Example Problem

An embodiment may be used in the situation when there is a particular request for access validation. For example, suppose Nelson is a manager in the finance department and suppose Nelson needs to validate that all the people who have payroll should have payroll or that anyone who has access to accounts receivable should have access to accounts receivable, and so on. Nelson may be the person that the compliance auditor goes to for access validation.

Access Validation Algorithm

It should be appreciated that determining whether individuals who have access to an entity should have access to such entity is based on ownership and, further, is tied to workflow. It should further be appreciated that such ownership for access validation is not at the privilege level, but at the sub-resource or the resource level.

In an embodiment, access validation is achieved the same way that workflow is derived. For example, whoever (or whatever entity) is the owner of a particular resource container is responsible for validating anything, such as permissions, access, and so forth, that's underneath or in the realm of responsibility for that particular resource container. Thus, in accordance with the embodiment, the ownership for the validation is built as organization/enterprise 17 builds out a particular area of industry, such as for example, an IT store, a shopping cart, business service catalogue, or business service repository.

Thus, in an embodiment, it is the responsibility of owners and sub-owners of resources and any sub-resources to provide access validation. In an embodiment, a default validator of a particular resource is the owner of the resource. For the purposes of discussion herein, the term, owner, has the same meaning as described hereinabove.

Reports

According to an embodiment, an access validation report may be generated. For example, a compliance officer may approach a finance director every six months and request from the finance director whether all individuals who receive payroll are validated. Put another way, the compliance office may want to know whether all people who are on the payroll should be on the payroll. Thus, an embodiment provides a payroll access validation report. Presently, the financial director would have to stop whatever task he or she was working on and switch over to the task of figuring out whether all those people on the payroll should, indeed, be on the payroll. Other examples may be other types of activity for which periodically, e.g. every six months, every once a year, once a quarter, and so on, people have to stop what they're doing and generate reports for large auditing firms.

Five Options

In an embodiment, five options are provided for responding to requests for access validation. In a first option, the system can respond with an affirmation that, yes, the particular individual(s) should still have access to the entity to which access was previously granted. For example, in response to an inquiry about whether an individual, Mary, should have access to a payroll system, the system may respond with yes, Mary should have access to the payroll system.

In an embodiment, a second option may be that the system responds with a negative condition, that, no, the individual should not have access to the entity to which access was previously granted. In the example above, the system may respond with no, Mary should not have access to the payroll system.

In an embodiment, a third option may be that the system responds with a stronger condition. For example, the system may respond that the individual(s) should not even have access to a broader or higher entity, node, or system. In the example above, the system may respond that Mary should not even have access to the enterprise system at all; she needs to be deleted from the enterprise system.

In an embodiment, a fourth option may be that the system responds with an answer indicating that the system does not know whether the individual or entity should have access to another entity that was previously granted or approved. For example, the system may not be able to determine whether Mary should have access to the payroll system. In one embodiment, the request for determination may be escalated. For example, the request for determination may be escalated to a compliance manager for a corporation. Thus, in the example about Mary, the access validation request may be escalated to a compliance manager for the compliance manager to determine whether Mary should have access to the payroll system.

In another embodiment, after an indication, such as after a particular amount of time, the access validation system may escalate the request for access validation to the next, higher node on the chain of ownership. For example, suppose a request for access validation was submitted to a store manager, where the request required the store manager to validate granted accesses to issued keys to the store. Suppose further that for some reason, the store manager did not respond to the access validation request in a particular period of time, e.g. in 48 hours. Or, perhaps the store manager only validated part of entities under his realm of responsibility. For example, perhaps the store manager was in the middle of validating previously approved accesses to resources when he or she was interrupted and did not return to complete the request for access validation in a particular amount of time. Then, in accordance with an embodiment, the system escalates the original request and sends another access validation request to the supervisor of the store manager. In an embodiment, given a specific timeframe, if validation has not occurred or has not been completed, the request is escalated up to an owner of a parent tree, i.e. up to the parent node, the next parent up. One skilled in the art would understand that given a hierarchy of nodes, a request for access validation can be issued to a variety of different nodes based on a variety of rules or algorithms, such as business rules or algorithms.

In an embodiment, a fifth option may be that the system determines that the entity should not have access to the resource; however temporary access to the resource is required or desirable. For example, the system may determine that Mary should not have access to the payroll system, but the manager needs her to have access for a week or so. Thus, in this case, the system may allow the access to occur for a temporary period or duration of time, e.g. now, but until the next cycle, or for the next five days or next 10 days, etc. Or, as another example, the access validator may decide to validate access for printing checks for a particular employee for a temporary amount of time because the employee typically in charge of printing checks is on vacation. In a different example, the access validation system may determine that a particular privilege is not only not appropriate, but that the individual should not even be a member of the group, in the realm of responsibilities of the access validator. For example, the system may determine that not only should Susie not have access to write checks, Susie should not have access to the financial system whatsoever. Then, Susie's ID can be deleted from the financial system group or other remedies may be pursued.

For the purposes of discussion herein, this fifth option may be referred to as handling an exception or allowing an exception.

Regardless of option, it should be appreciated that in an embodiment, the access validation system updates access validation entries by storing entitlements for users.

For the purposes of discussion herein, entitlements may be referred to as accesses or privileges, as well. Thus, for example, the system may display or otherwise indicate that a particular user has access to a financial payroll system, has the access to write checks, has the access to print invoices, and has the access to create invoices. It should be appreciated that such example is for illustrative purposes only and An Exemplary Embodiment In an embodiment, access validation may be performed automatically without any assistance. Workflow approval or access validation is each created without having to define or configure business rules. For example and for either application, an embodiment may build out an IT shopping cart, as described hereinabove. Such process may be also described as building out a business service catalogue. Thus, workflow approval and access validation may be built into the hierarchy and the structure of that catalogue. It should be appreciated that no other company or entity today teaches, fairly suggests, or even contemplates such workflow approval processes or such access validation processes. Importantly, an embodiment of access validation stores the ownership in such a way as described herein and the hierarchy of ownership (or network or nodes of ownerships) becomes or is used in determining the workflow. Put another way and generally speaking, the ownership becomes the system's access validation.

An Example Embodiment

In an embodiment, access validation may be achieved in the workflow context of FIG. 4 by replacing the request for approval with a request for access validation, as follows.

The embodiment provides a contextual workflow process based on the structure of the hierarchical resource list 306. The process of generating contextual workflows begins with a configuration block (not shown) in which the identities of each owner, administrator, or manager (collectively referred to hereinafter as manager(s)) are determined of each user, resource 15, sub-resource, and privilege 310 in the resource list 306. An organization chart and/or the authoritative source domain 34, for example, may be used to identify the managers of people. In some cases, a manual process may have to be employed to compile a list of the managers of the resources 15 and privileges 310.

Then in the next block (not shown), in response to the access validation system receiving a request for validating access to privileges, the access validation system initiates the access validation request chain whereby for each privilege to be validated, access validation is first requested from the manager of a target user of the granted privilege. For example, the manager may inquire from the target user whether the target user should have been granted the privilege.

In the next block (not shown), it is determined whether the manager validated the access or privilege. If the manager validated the privilege, then access validation is requested from the manager of the granted privilege. Then, it is determined whether the manager of the granted privilege validates the granted privilege. If so, then access validation is requested from the manager of the resource. It is determined whether the manager of the resource validates the accesses.

It should be understood that not every resource 15 and privilege 310 may have an associated manager. It should also be understood that the access validation process may loop, meaning that there may be one or more privilege and resource managers and associated requests for access validation depending on the level of the resource hierarchy.

If all the managers performed access validation, then the system determines whether a particular privilege is marked special. According the exemplary embodiment, a special privilege is one that requires further approval by a person within a designated position in the organization/enterprise, such as an officer or executive. If so, then access validation may be requested from the person having the designated position, e.g., CEO, COO, or CFO associated with granting of the special privilege.

If the privilege is not marked special and if all the managers performed access validation, then the particular privilege is validated for the target user.

If any of the managers deny validation, then the validation for the privilege is denied and the access validation process ends.

An Example Embodiment—A Group

It should be appreciated that in an embodiment, a designated access validator may be a group rather than an individual, in which case, the workflow process may be configured to require a response to the access validation request from anyone or any member from the group or from all the people or from all the members in the group.

As an example, the owner could be an actual group mailbox. What that may mean is that the owner of this group mailbox will get an email saying, "Hey, Nelson just needs access to the financial system." Instead of going to one person, the request goes to a group mailbox, where, for example, 20 people can check that group mailbox. Thus, person assigned to the group mailbox may can go into that mailbox and see whether anyone has acted on such request. And if no one has acted on the request, such person may be the first one to click on the request act on the associated item.

It should be appreciated that an advantage of using a group mailbox may be that the system or user is not required to send out numerous, e.g. 19, emails to the other people in the group to request approval or validation of some event or resource. Thus, embodiments herein facilitate avoiding a ton of additional emails. While such example may invoke the idea that only 19 emails need be sent, however, if a system receives 1000 requests a day times 19 people, that's 1900 emails that embodiments herein help to avoid.

Schedule and Issue Reminders to Validate Resources

In an embodiment, access validation occurs on a scheduled basis. For example, every 90 days, once a year, or every six months, access validation is required because of compliance reasons.

Thus, an embodiment provides reminder notifications on a periodic or a one-time basis. For example, the access validation system may send out a reminder to all interested parties of an enterprise or corporation every 90 days. The reminder may be communicated via an email, instant message, SMS, text message, and so forth. One skilled in the art could readily appreciate that a variety of modes of communication are contemplated.

In an embodiment, a notification email is sent to a particular owner, where the email may contain a link to a list of previously granted accesses that were granted by the owner or, in another embodiment, sub-owners. For example, the list may show people who were granted access to the payroll system, where the granting of access was performed by the owner to which the link to the list was sent. In an embodiment, the list may show when each entry, e.g. person granted access, was last validated.

In an embodiment, when a list contains an entry that does not show any indication of being previously validated, e.g. such as by a checked box or by a displayed date of validation, the owner is required to validate the particular entry. In accordance with an embodiment, the owner validates the particular entry by traversing through the five options as described hereinabove.

The interested parties may include the owners of the resources. That is, the interested parties may include resource owners, sub-resource owners, and so on. Such reminder notifications may indicate the individual privileges that the owners may need to validate. It should be appreciated that it is not people that are being validated, but privileges. In accordance with embodiments described hereinabove, the system is not aware of, i.e. does not know which individuals have been assigned privileges.

Thus, from the perspective of an owner, while it may be people in the end result who are granted access, it is the privileges that are under the umbrella of responsibility of the particular owner.

Continuous Access Validation Process

An embodiment provides a process for access validation that is a continuous process and that may be automated. Thus, for example, when an auditor shows up at the office of an owner, the owner, according to an embodiment, just generates a report or presses a link on the report and, based on the results of generating the report or pressing a link on an existing report, may answer, "I last validated access to my resources on October 31$^{st}$ and here's the report."

Business Intelligence or Business Properties

In an embodiment, an access validator, i.e. the person or entity performing the access validation, may be based on particular attributes. In an embodiment, the set of attributes may include attributes having to do with business intelligence and attributes having to do with business properties. Some examples of such attributes may be title, job position, job code, department, location, and so forth. As well, such attributes may be associated with target users, people, devices, types of access, types of assets, resources, and so on.

For example, if the system knows that a particular owner of a business resource is located in Texas (attribute equals location) and has the title of store manager (attribute is title), then the system may determine that such particular owner is responsible for validating other entities, e.g. assistant managers, who are in charge of the particular Texas store. Another example may be that such particular manager is responsible for validating all the point of sale accesses (e.g. particular cash registers) for that given store or that particular location, and so on. One skilled in the art would understand that a variety of embodiments may be used to derive the person or entity responsible for access validation based in part on attributes of business intelligence and attributes of business properties.

Thus, in an embodiment, access validators may be derived from business intelligence or business properties, as opposed to or in concert with deriving access validators from the business service catalogue or hierarchy described hereinabove.

Entering Justification

In an embodiment, for one or more of the five options discussed hereinabove, an access validator or sometimes referred to as the compliance validator enters a justification for a particular item.

Extending the Workflow

An embodiment uses the same hierarchy discussed hereinabove to get workflow and a process based on the workflow to achieve any type of validation. For example, in accordance with an embodiment, the access validation system may validate or approve of a request for an expense report. For example, such expense report may have an owner to which a request for approval or to which an access validation request may be submitted. In such example, the owner, or other owners within a given hierarchy of owners, may approve or deny the expense report or may validate or not validate the expense report. As another example, access validation system may be used to approve or deny or validate or not validate an end-of-month close for a corporation.

An Embodiment—Social Media

In an embodiment, access validation system may be configured to work with or incorporate social media aspects. For example, in accordance with an embodiment, a social media application may be configured to link to or use all or part of approval or access validation system to validate or not validate particular requests issued from the social media application. For example, while at the configured social media application, a student may initiate a request for approval or validation from a parent of a proposed course curriculum at a college. As another example, while at the mall, a child may initiate a request for approval or validation to purchase a shirt or for increasing his or her credit card limit by using the access validation system. As another example, via an iPad or iPhone, a parent can approve whether the child can stay over the child's friend's house for a sleepover.

Further, as an example, an embodiment may perform a type of inventory or ensure that a teacher has all the people assigned to the class in attendance at the class. An embodiment assists a user with the following: Are all my students here? Yes, I just validated their access, they're all here today. Is the entire inventory, all products, on the shelf? Yes they are. Wait, no, someone stole something. I have too many televisions; another one showed up.

As another example, via a configured social media application, a user may approve or validate a process or other type of action by simply indicating such, e.g. by clicking a button. Thus, an embodiment includes not simply allowing a user to vote for something on a page, but to initiate a dynamic workflow process determined in part by a hierarchy by simply clicking a button.

Thus, one skilled in the art may readily recognize that an embodiment provides a configured system that employs the above-discussed hierarchy schema and the dynamic workflow process combined with approval or access validation. Such embodiment may be implemented in environments beyond identity management industries and beyond access validation of hard and soft resources. That is, one skilled in the art would readily recognize that techniques and approaches discussed herein may apply to a limitless variety of situations and industries.

Cost Benefits

It should be appreciated that embodiments herein completely eliminate the cost of a developer having to program workflow scripts, code, GUI screen designs. None of that is required by embodiments herein. For example and as described amply hereinabove, a user may just build out a "store". The associated workflow is dynamically generated when ownership is assigned; an access validation flow is generated when ownership is assigned. Thus, one or more embodiments may be deployed in a few days whereas other present systems need several years to deploy.

Put another way, presently, other systems in the market take years to deploy because they have to write business books, they have to bring in programmers, they have to outsource such work to India, and they have to hire expensive management consultant firms. By way of embodiments herein, an enterprise may simply subscribe to corresponding software and system and is done. Users may simply choose ownerships and they're done. Embodiments herein provide a system and method that is very unique and very cost effective.

An Exemplary System and Method

An exemplary access validation system and method in accordance with one or more embodiments is provided by Compliance Auditor by Avatier Corp., San Ramon, Calif.

In an embodiment, Compliance Auditor comprises the following features: Compliance Management—Access Certification; Role Management—Privilege & Role Governance; Identity Intelligence—Risk Modeling; Identity Intelligence—Identity and Access Dashboards; and Identity Intelligence—Reporting.

Compliance Management—Access Certification

According to an embodiment, two important pieces of identity governance may be the review and certification of user access privileges. In order to meet some regulatory requirements such as Sarbanes-Oxley and HIPAA, an end-user may verify and also understand all users access privileges that come with each role within the organization. Careful and continuous evaluation of this data may keep the end-user's access certification process in compliance and may mitigate risk. Avatier Compliance Auditor may make access certification process for the end-user more efficient and accurate by accelerating verification methods and improving security.

Automate and Improve Compliance Effectiveness

With Avatier Compliance Auditor the end-user may automate the entire access certification process, making it a lot easier to manage and more reliable. Furthermore, Compliance Auditor is configured to create comprehensive reports that show the level of risk on each access or change certification based on policy violations. This useful feature allows both business and IT users to focus on the key areas in order to reduce risk and increase effectiveness.

In an embodiment, Compliance Auditor may be configured to handle different categories of certification that may include certifications for business managers, group owners, application owners, and other informal certifications. In addition, Compliance Auditor has workflow options that may be very easy to modify. Some of these options include delegation or reassignment of certifications; configuration of notification and escalations; and the ability to define challenge and remediation periods. Certifications may be done on a periodic or continuous basis allowing reviewers to have access to up-to-date information, including policy violations and potential threats.

Role Management—Privilege & Role Governance

To make sure an organization is complying with corporate and governance policies, the managers and auditors should revise and confirm that all users have the correct access privileges on a regular basis. According to an embodiment, this feature allows combining managers' business knowledge and Avatier configured Compliance Auditor to find policy violations and unsuitable access in a much easier and faster fashion. Compliance Auditor is configured to allow grouping complex technical access rights into logical business roles in a very efficient way.

Consistently Meet Compliance and Audit Requirements

Compliance Auditor is configured to make it easy for an end-user to translate business policy into technical IT controls; therefore, organization policy and business are on the same page. Since Compliance Auditor may provide very comprehensive reports and detailed identity analytics, managers may now have access to a variety of very clear and easy to understand audit data and compliance metrics without problems.

Identity Intelligence—Risk Modeling

In order to ensure regulatory compliance an end-user may desire to have a very well developed risk management system. Many companies still struggle to efficiently protect their applications and data. They don't have an easy way to track, analyze and control the user access to these critical resources. Avatier Compliance Auditor is configured to give them a real-time description of potential risk factors across multiple business environments and proactively manage to reduce possible compliance exposure and liability.

Compliance Auditor combines strong risk analytics with automated monitoring to allow organizations to analyze, manage and diminish risk with supreme visibility into key risk metrics.

Quantify Risk and Prioritize Compliance Efforts

Avatier Compliance Auditor is configured for reviewing security risk by user and resource throughout the entire IT environment. Since Compliance Auditor uses configurable algorithms, it may easily calculate and assign a risk score to each application, system resources, and even employees who have access to key systems and applications. Moreover, Compliance Auditor is constantly updating these risks scores based on a variety of factors.

Identity Intelligence—Identity and Access Dashboards

The identity intelligence feature from Avatier Compliance Auditor is configured to allow organizations to have better visibility into possible risk factors across their business. These organizations may transform technical identity data spread across several systems into easy to understand and centralized significant information. Even across the most complicated business environments the Compliance Auditor provided customizable dashboard may offer a clear understanding of identity and access information to help proactively manage and strategically focus the organizations compliance efforts.

Ensure Compliance and Improve Audit Performance

The user-friendly dashboard console provided by a configured Avatier Compliance Auditor helps manage and report very important identity governance metrics across the organization. Thanks to its tailored views, easy to understand charts, graphs, full comprehensive reports and task status, Compliance Auditor is configured to allow business, IT and audit users to easily access the source data for more details or to find the status of pending tasks. Users have the capability of personalizing their dashboard according to their level of sophistication, compliance role and authority within the organization. For instance, a department manager may only see the access and activity data for the users he or she manages; while a compliance officer typically has a complete view of all audit and compliance data across the company.

Identity Intelligence—Trending Reports

Avatier Compliance Auditor is configured to provide detailed and fully comprehensive reporting and analytics that help companies improve the effectiveness of internal controls and ultimately, meet compliance and protect their business. With Compliance Auditor managers may easily evaluate their risks, prioritize security efforts and take the necessary actions to minimize those risks.

This solution converts the complex and sometimes hard to understand information into easy to read data. It may also provide insightful and very useful reports that simplify and improve the compliance processes and performance for users within the organization.

Furthermore, Compliance Auditor is configured to offer a complete set of out-of-the-box compliance and role management reporting templates to help determine relevant compliance metrics and procedures.

Create Transparency to Key Compliance and Role Management Data

Avatier Compliance Auditor is configured to offer more key information through its identity intelligence reporting and analytics capabilities. Thanks to the predesigned reporting templates or impromptu queries users across the company may access relevant data in a well-organized and timely manner. With Compliance Auditor IT may quickly provide up-to-date information on access and role privileges to different departments within the organization in just minutes. In addition, Compliance Auditor is configured to also give users the capability of pulling their own reports and data through the easy-to-use reporting and analytics platform.

An Example Machine Overview

Figure 8:
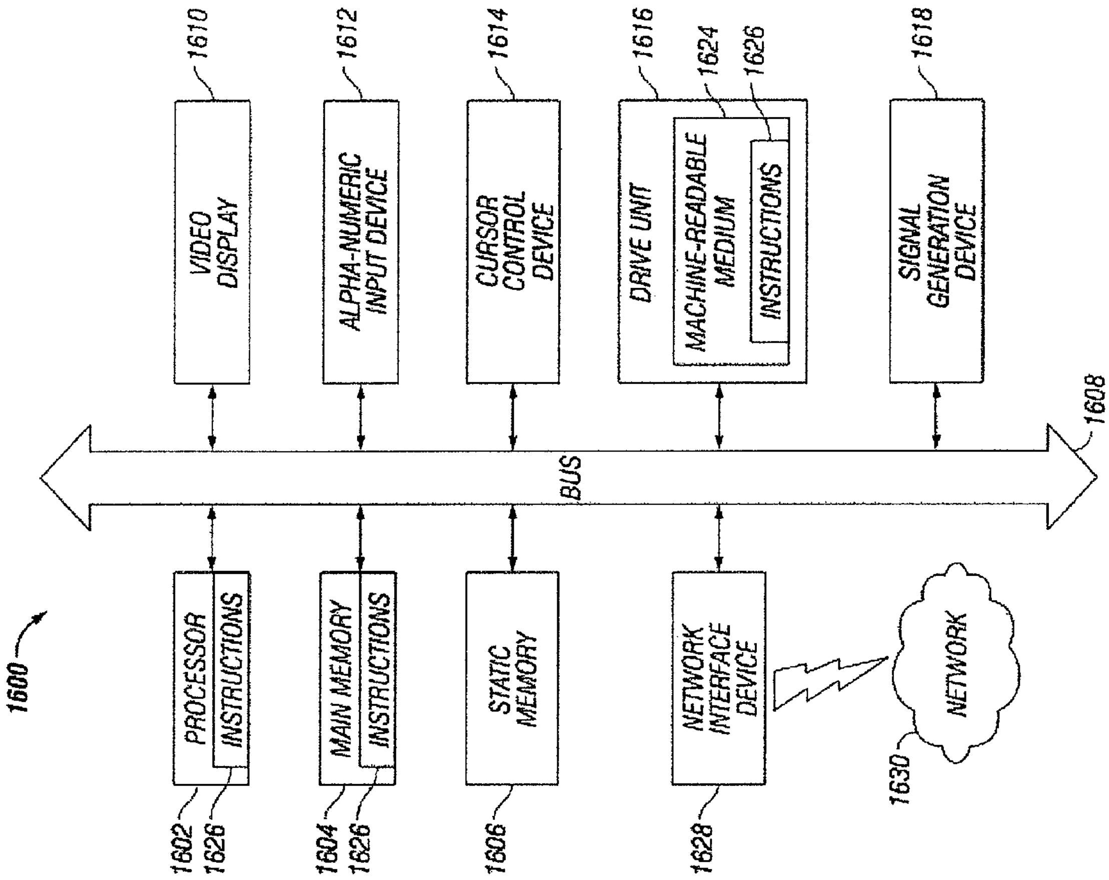
FIG. 8 is a block schematic diagram of a system in the exemplary form of a computer system according to an embodiment.

FIG. 8 is a block schematic diagram of a system in the exemplary form of a computer system 1600 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus configured for performing access validation, comprising:

one or more processors;

an access validation application executable by said one or more processors, said access validation application configured for:

receiving, at a server from a requesting entity over a network, a request to perform access validation of a particular resource at an organization site or at a site external to the organization site, to which access had previously been granted;

wherein the particular resource has a corresponding owner and is at a particular location within a hierarchy of resources, wherein the owner causes a chain of validation of entities which are in its realm of responsibility, each entity comprising one or more sub-resources, each said sub-resource having a corresponding owner, and wherein each corresponding owner of each said sub-resource causing a chain of validation of entities which are in its realm of responsibility until there are no more sub-resources;

responsive to receiving the request, determining, at said server, whether the previously granted access to said particular resource is valid, said determining comprising:

identifying, by the server and from configuration data stored at configuration database, the owner of the particular resource and a list of at least one sub-resources and its owner;

responsive to identifying the owner of the particular resource and the list of at least one sub-resource and its owner, sending, by said owner of the particular resource over the network, a request for access validation intended for said at least one owner of said at least one sub-resource of the particular resource, said request for access validation causing said at least one owner to send a request for access validation intended for at least one owner of its sub-resource, when present, iteratively, until no more sub-resources are present;

sending by said owner of the particular resource over the network, a request for access validation intended for said remaining owners of said remaining sub-resources of the particular resource, until there are no more sub-resources, causing each owner of each remaining sub-resource to send a request for access validation intended for each of its corresponding sub-resource, iteratively, until there are no more sub-resources; and in response to determining whether the previously granted access to said resource is valid, sending, over the network by said server for delivery to said requesting entity, a response having any of the following five options:

an affirmation of validity;

a negative indication that said previously granted access to said resource is not valid;

a stronger condition;

an answer indicating that it cannot be determined whether the previously granted access to said resource is valid; and an exception, wherein it was determined that the previously granted access to the resource is not valid, however that temporary access to the resource is required;

wherein configuring said access validation application does not require business rules.

2. The apparatus of claim 1, wherein a designated approver representing an owner from the at least one owner is a group rather than an individual and wherein the request to access validation is sent to any member of the group or to all members in the group.

3. The apparatus of claim 1, wherein an answer indicating that it cannot be determined whether the previously granted access to said resource is valid, further comprises escalating the request for performing access validation of the particular resource to a compliance manager or to a higher node on the hierarchy to determine whether the access is validated.

4. The apparatus of claim 1, wherein the stronger condition is that access should not be granted to a higher node on the hierarchy, the higher node containing the resource.

5. The apparatus of claim 1, wherein access validation is performed in real-time or automatically.

6. The apparatus of claim 1, wherein access validation is performed at a later point in time from when one or more privileges were granted.

7. The apparatus of claim 1, wherein access validation occurs on a scheduled basis.

8. The apparatus of claim 1, wherein determining whether the previously granted access to said resource is valid is based in part on one or more business-related attributes.

9. The apparatus of claim 1, wherein a particular request is a type of resource and wherein said access validation application is further configured for:

performing validation of said particular request, wherein performing validation of the particular request comprises determining whether the particular request is granted;

wherein determining whether the particular request is granted comprises using a structure of a hierarchy of resources and a location of the particular request within the hierarchy and by requesting access validation from at least one owners corresponding to at least one sub-resource as defined by the structure of the hierarchy.

10. A computer-implemented method for performing access validation, comprising:

receiving, at a server from a requesting entity over a network, a request to perform access validation of a particular resource at an organization site or at a site external to the organization site, to which access had previously been granted;

wherein the particular resource has a corresponding owner and is at a particular location within a hierarchy of resources, wherein the owner causes a chain of validation of entities which are in its realm of responsibility, each entity comprising one or more sub-resources, each said sub-resource having a corresponding owner, and wherein each corresponding owner of each said sub-resource causing a chain of validation of entities which are in its realm of responsibility until there are no more sub-resources;

responsive to receiving the request, determining, at said server, whether the previously granted access to said particular resource is valid, said determining comprising:

identifying, by the server and from configuration data stored at configuration database, the owner of the particular resource and a list of at least one sub-resources and its owner;

responsive to identifying the owner of the particular resource and the list of at least one sub-resource and its owner, sending, by said owner of the particular resource over the network, a request for access validation intended for said at least one owner of said at least one sub-resource of the particular resource, said request for access validation causing said at least one owner to send a request for access validation intended for at least one owner of its sub-resource, when present, iteratively, until no more sub-resources are present;

sending by said owner of the particular resource over the network, a request for access validation intended for said remaining owners of said remaining sub-resources of the particular resource, until there are no more sub-resources, causing each owner of each remaining sub-resource to send a request for access validation intended for each of its corresponding sub-resource, iteratively, until there are no more sub-resources; and in response to determining whether the previously granted access to said resource is valid, sending, over the network by said server for delivery to said requesting entity, a response having any of the following five options:

an affirmation of validity;

a negative indication that said previously granted access to said resource is not valid;

a stronger condition;

an answer indicating that it cannot be determined whether the previously granted access to said resource is valid; and an exception, wherein it was determined that the previously granted access to the resource is not valid, however that temporary access to the resource is required;

wherein business rules are not required; and wherein said method is performed by a computer system configured to perform said method.

11. The method of claim 10, wherein a designated approver representing an owner from the at least one owner is a group rather than an individual and wherein the request to access validation is sent to any member of the group or to all members in the group.

12. The method of claim 10, wherein an answer indicating that it cannot be determined whether the previously granted access to said resource is valid, further comprises escalating the request for performing access validation of the particular resource to a compliance manager or to a higher node on the hierarchy to determine whether the access is validated.

13. The method of claim 10, wherein the stronger condition is that access should not be granted to a higher node on the hierarchy, the higher node containing the resource.

14. The method of claim 10, wherein access validation is performed in real-time or automatically.

15. The method of claim 10, wherein access validation is performed at a later point in time from when one or more privileges were granted.

16. The method of claim 10, wherein access validation occurs on a scheduled basis.

17. The method of claim 10, wherein determining whether the previously granted access to said resource is valid is based in part on one or more business-related attributes.

18. The method of claim 10, further comprising:

performing validation of said particular request, wherein performing validation of the particular request comprises determining whether the particular request is granted;

wherein determining whether the particular request is granted comprises using a structure of a hierarchy of resources and a location of the particular request within the hierarchy and by requesting access validation from at least one owners corresponding to at least one sub-resource as defined by the structure of the hierarchy.

* * * * *